(No Model.) 8 Sheets—Sheet 1.

A. E. GORSE.
MACHINE FOR MAKING BARBED WIRE FENCING.

No. 441,237. Patented Nov. 25, 1890.

WITNESSES
W Harvey Muzzy
Frank A. Loeffler

INVENTOR
Arthur E. Gorse
by W H Babcock
Attorney (No Model.)
8 Sheets—Sheet 2.

A. E. GORSE.
MACHINE FOR MAKING BARBED WIRE FENCING.

No. 441,237.
Patented Nov. 25, 1890.

WITNESSES
W. Harvey Murray
Frank A. Doffler

INVENTOR
Arthur E. Gorse
by W. H. Babcock
Attorney (No Model.)

A. E. GORSE.

MACHINE FOR MAKING BARBED WIRE FENCING.

No. 441,237.

8 Sheets—Sheet 3.

Patented Nov. 25, 1890.

WITNESSES
W. Harvey Muzzy
Frank A. Loeffler

INVENTOR
Arthur E. Gorse
by W. H. Babcock
Attorney (No Model.) 8 Sheets—Sheet 4.
A. E. GORSE.
MACHINE FOR MAKING BARBED WIRE FENCING.

No. 441,237. Patented Nov. 25, 1890.

WITNESSES
W. Harvey Muzzy
Frank A. Loeffler.

INVENTOR
Arthur E. Gorse
by
W. H. Babcock
Attorney (No Model.) 8 Sheets—Sheet 5.
A. E. GORSE.
MACHINE FOR MAKING BARBED WIRE FENCING.
No. 441,237. Patented Nov. 25, 1890.
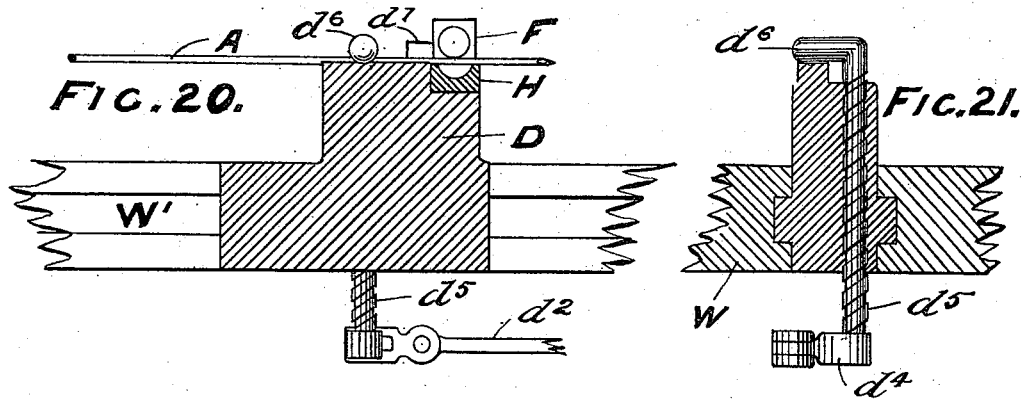
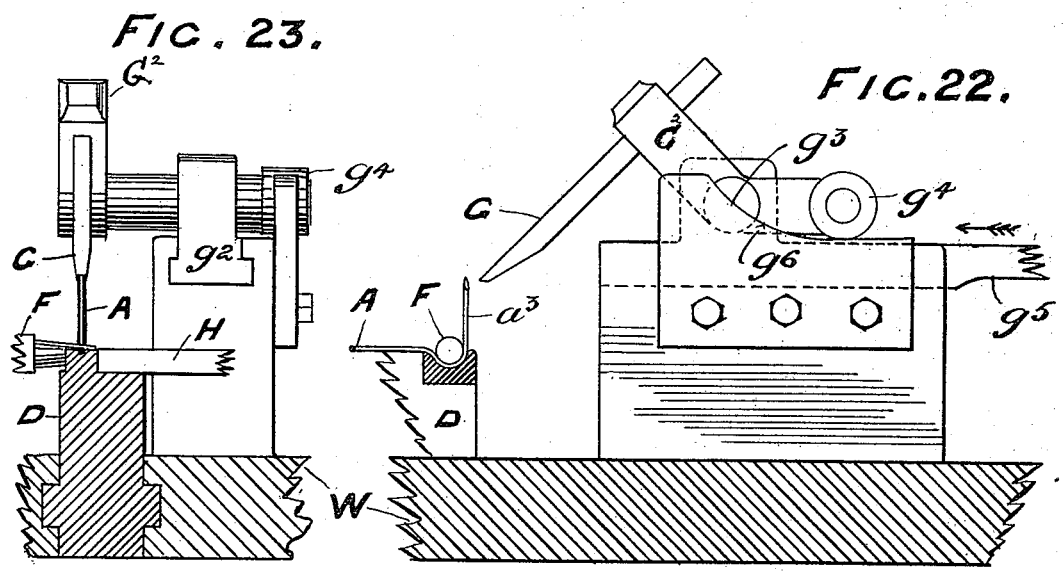
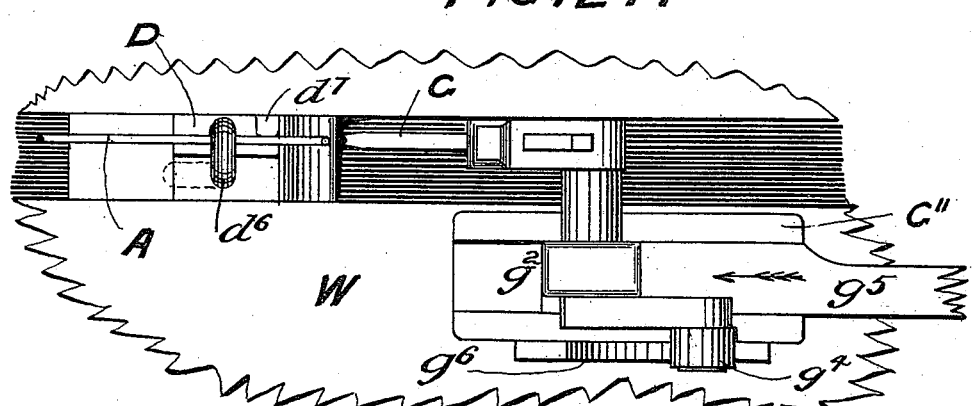

(No Model.) 8 Sheets—Sheet 6.
A. E. GORSE.
MACHINE FOR MAKING BARBED WIRE FENCING.
No. 441,237. Patented Nov. 25, 1890.
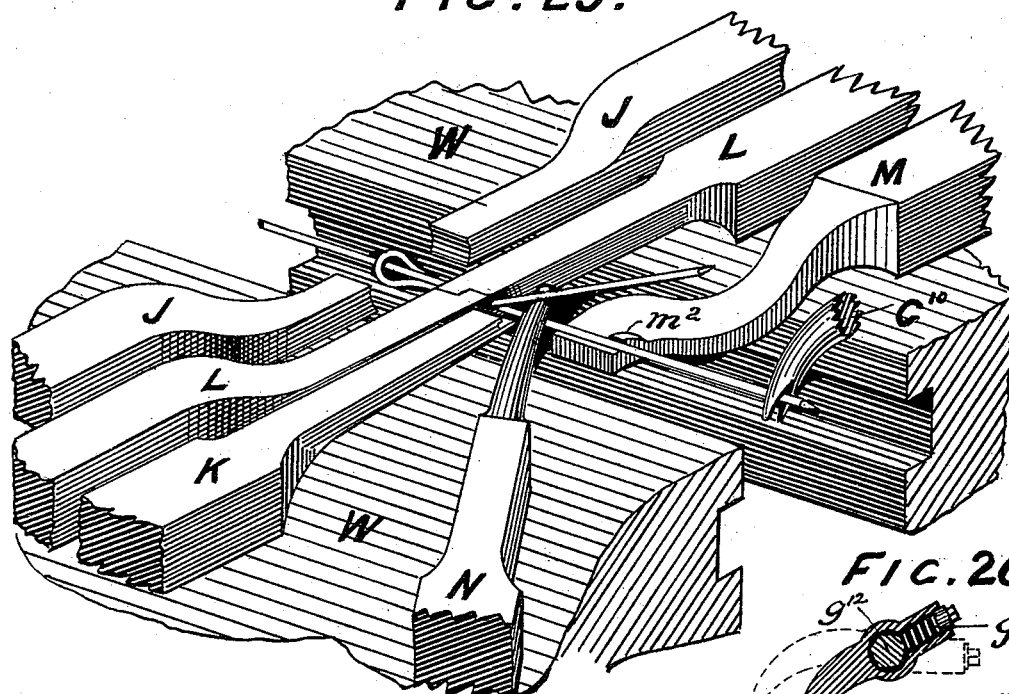
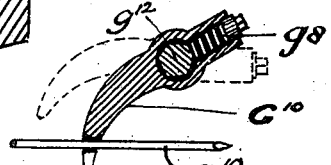
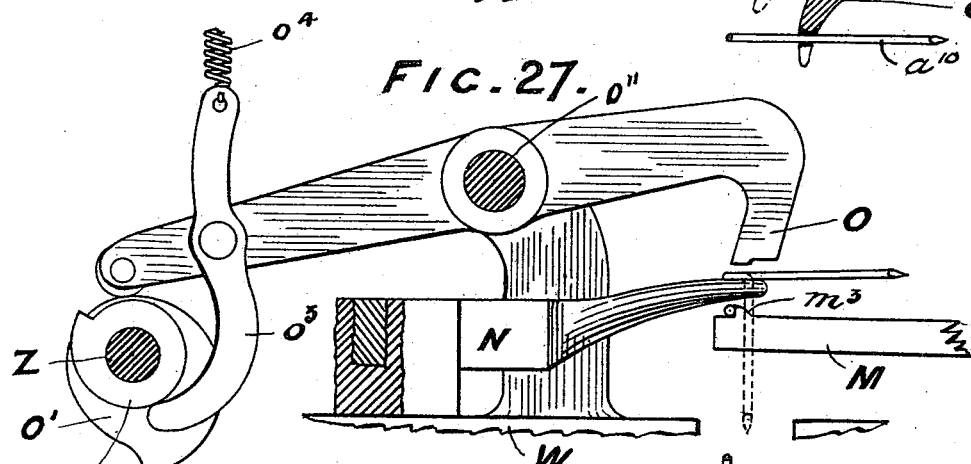
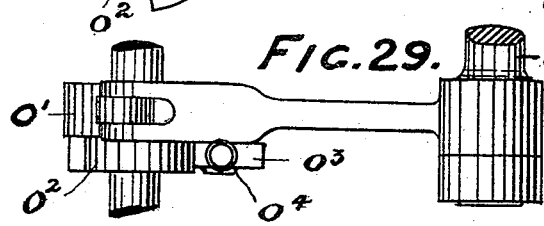
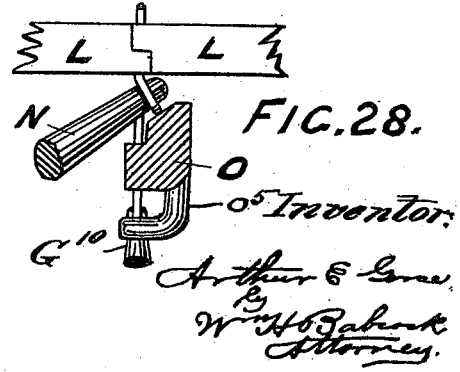

(No Model.) 8 Sheets—Sheet 7.

A. E. GORSE.
MACHINE FOR MAKING BARBED WIRE FENCING.

No. 441,237. Patented Nov. 25, 1890.

WITNESSES
W Harry Munzy
Frank A Löffler

INVENTOR
Arthur E Gorse
by W H Babcock
Attorney (No Model.) 8 Sheets—Sheet 8.
A. E. GORSE.
MACHINE FOR MAKING BARBED WIRE FENCING.

No. 441,237. Patented Nov. 25, 1890.

WITNESSES
W Harvey Muzzy
Frank A. Heffler

INVENTOR
Arthur E. Gorse
by W H Babcock
Attorney

UNITED STATES PATENT OFFICE.

ARTHUR EDMUND GORSE, OF WEST BROMICH, ENGLAND.

MACHINE FOR MAKING BARBED-WIRE FENCING.

SPECIFICATION forming part of Letters Patent No. 441,237, dated November 25, 1890.

Application filed August 14, 1890. Serial No. 361,955. (No model.)

*To all whom it may concern:*

Be it known that I, ARTHUR EDMUND GORSE, machinist, of West Bromich, in the county of Stafford, England, and a subject of the Queen of Great Britain, have invented a certain new and useful Improved Machine for the Manufacture of Barb-Wire Fencing, of which the following is a specification.

My invention has for its object an improved machine for the manufacture of barb-wire fencing by which I am able to obtain in a single strand of wire barbs of any lengths and at any intervals of the most substantial kind and in a comparatively simple and inexpensive manner.

In order that my invention may be clearly understood and more easily carried into practice I have appended hereunto eight sheets of drawings, upon which I have fully illustrated the nature and working of my said invention.

Figure 1:
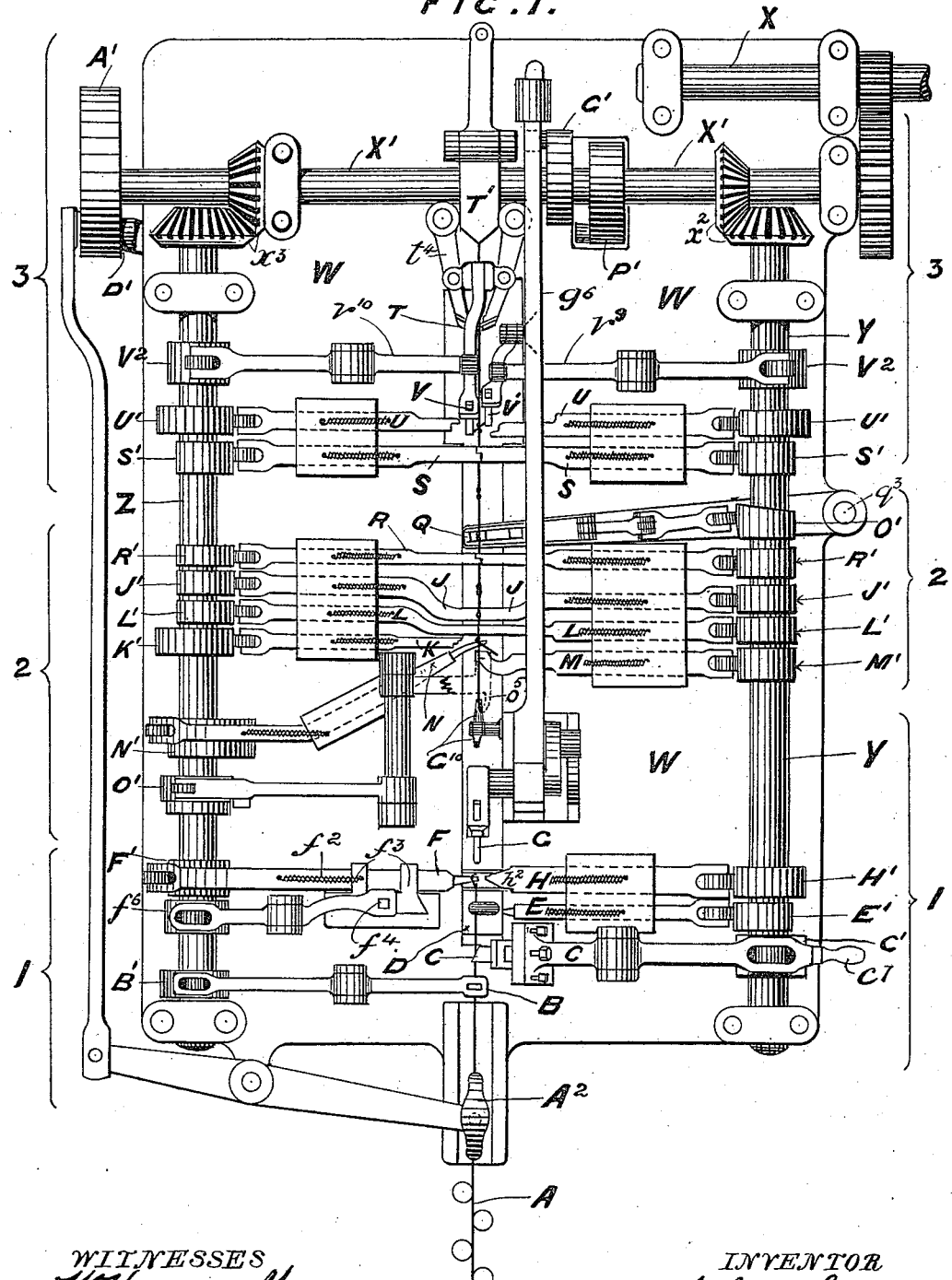
Figure 2:
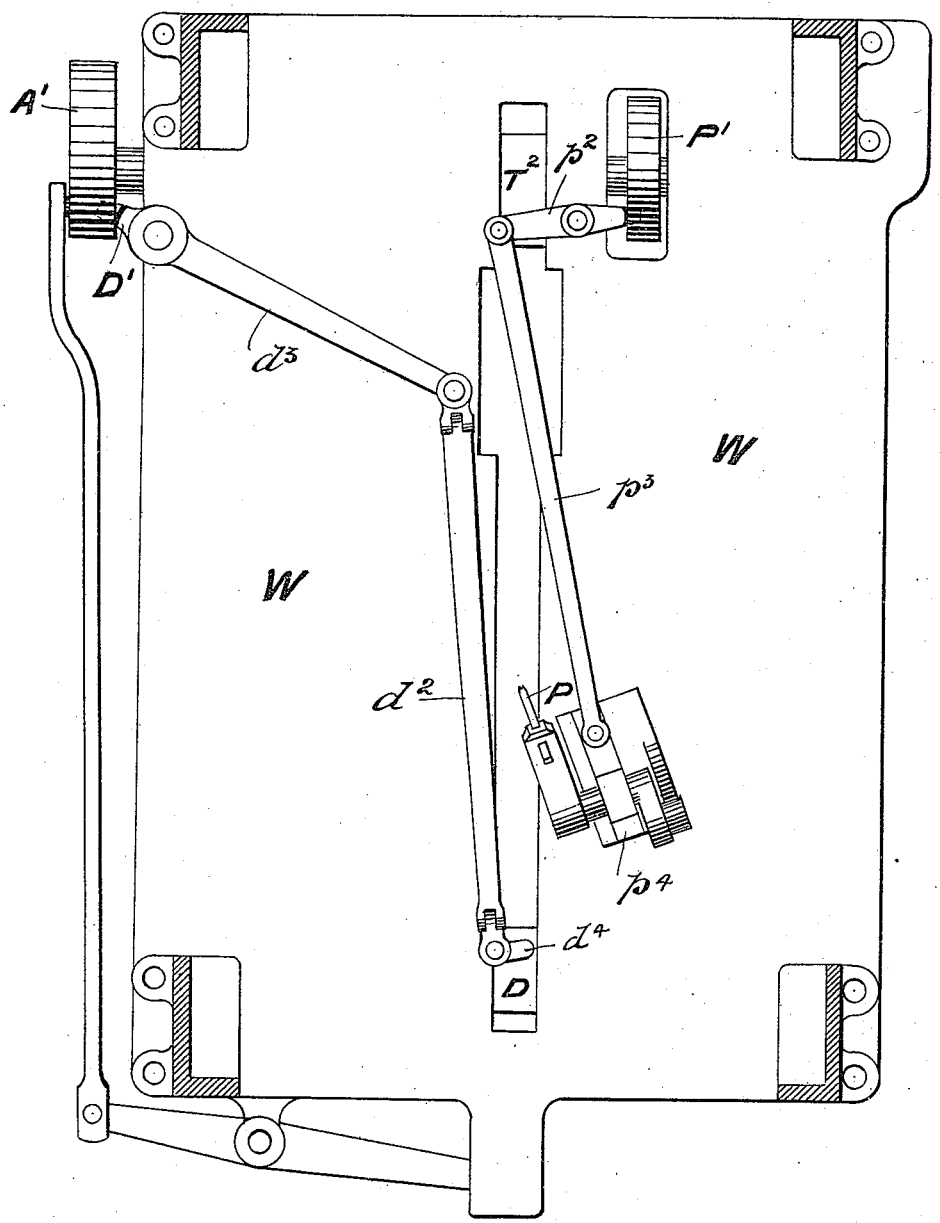
Figure 3:
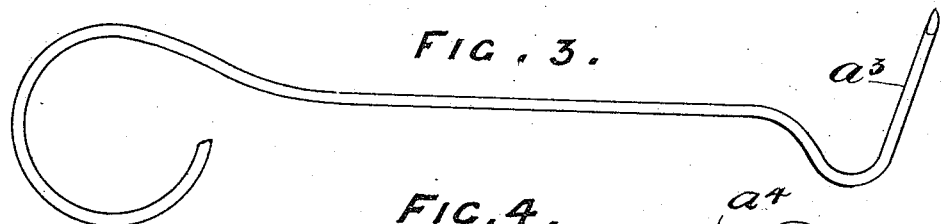
Figure 4:
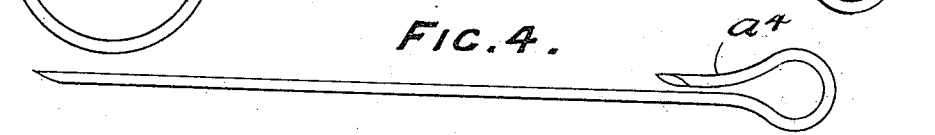
Figure 13:
Figure 14:
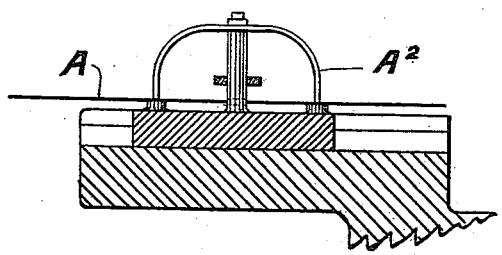
Figure 15:
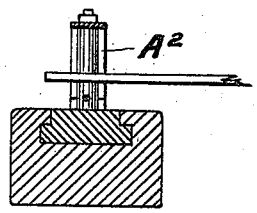
Figure 16:
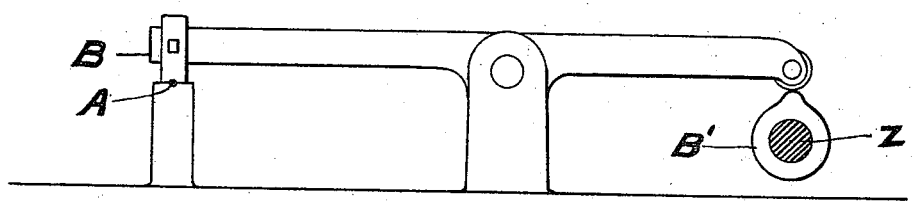
Figure 17:
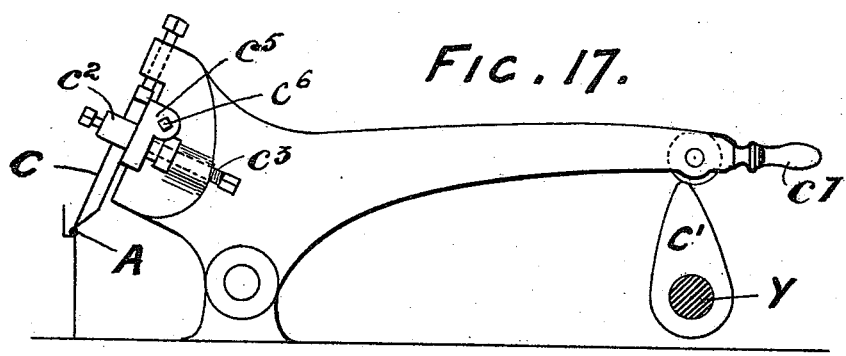
Figure 18:
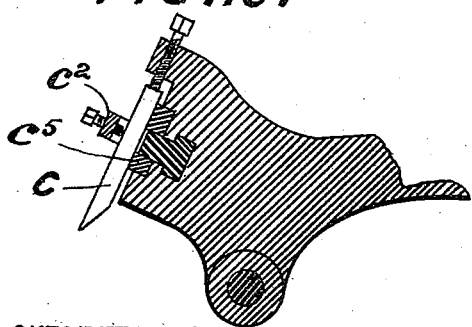
Figure 19:
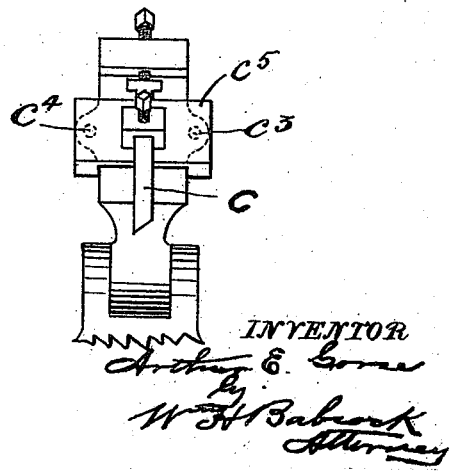
Figure 30:
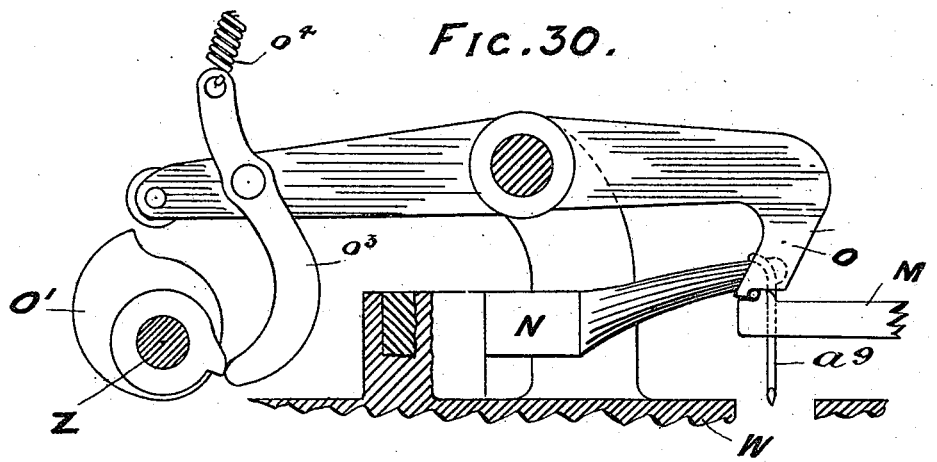
Figure 31:
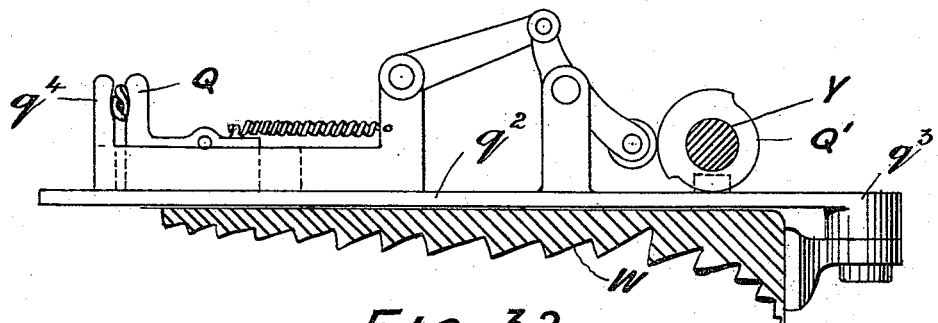
Figure 32:
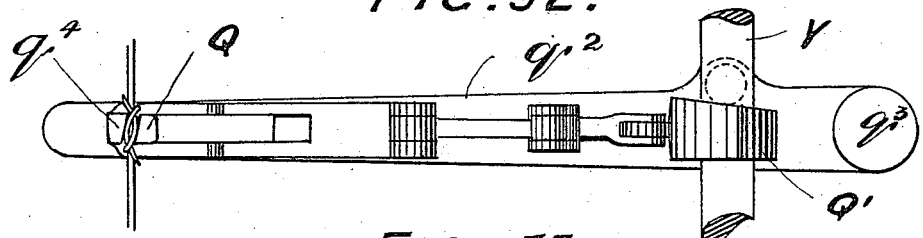
Figure 33:
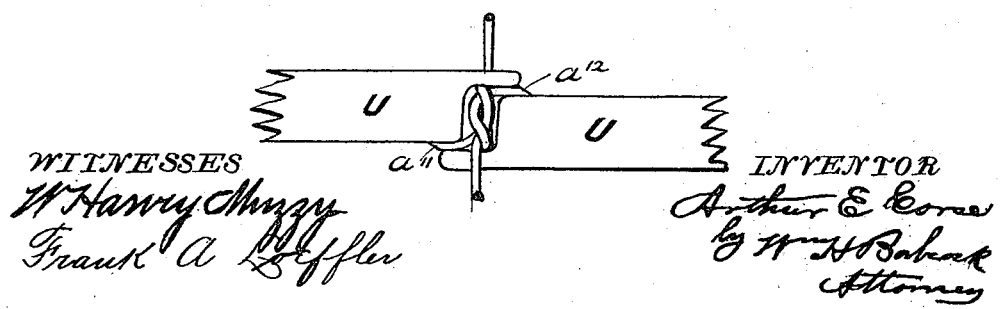
Figure 34:
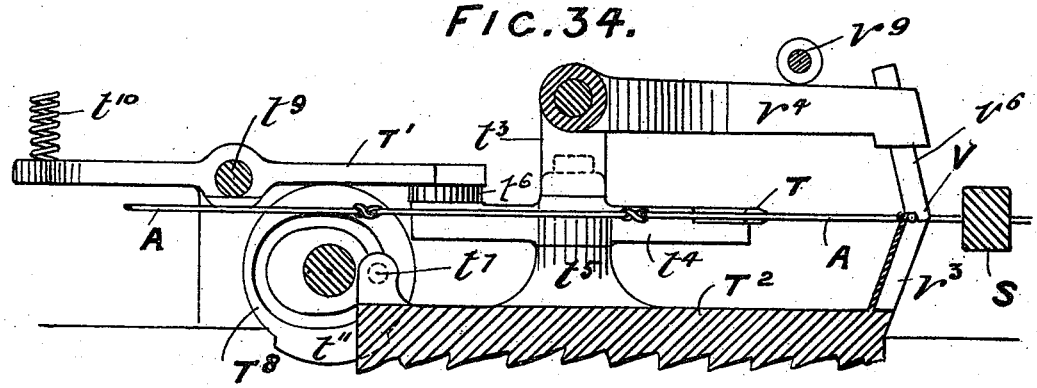
Figure 35:
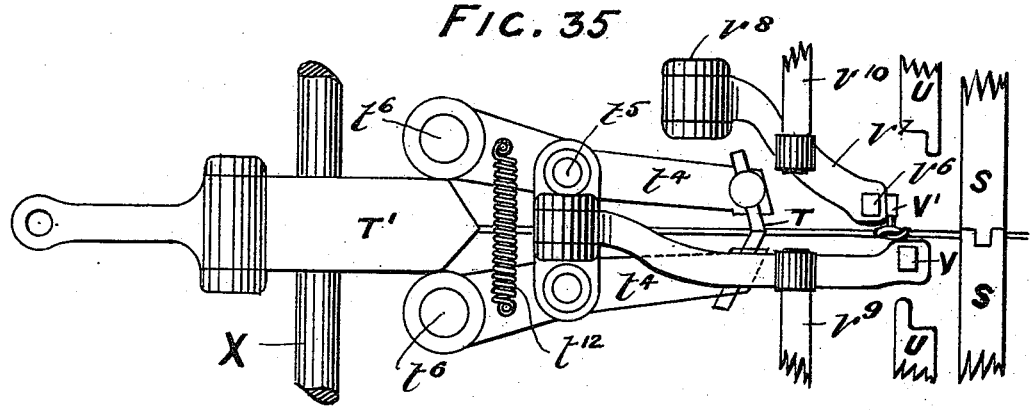
Figure 36:
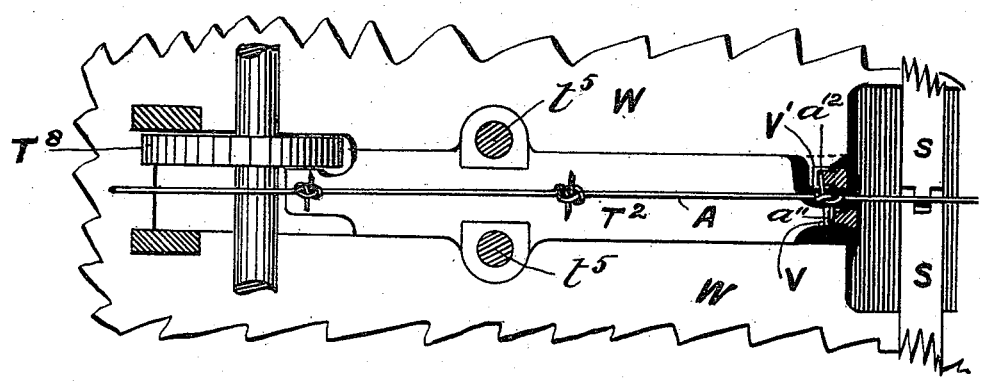

Figure 1 is a general plan of my machine. Fig. 2 is a similar plan, but looking up from underneath the bed. Figs. 3 to 12 show the various stages of bending through which the wire A passes during its passage through the machine, Figs. 3, 4, 8, 9, 10, and 12 being shown in elevations and Figs. 5, 6, 7, and 11 on plan. Fig. 13 is an elevation showing a slight modification in the shape of the knot or twist. Fig. 14 is a longitudinal section through the wire-feed $A^2$. Fig. 15 is a cross-section of same. Fig. 16 is an elevation of the grip B. Fig. 17 is a side elevation of the cutter C. Fig. 18 is a vertical section through same. Fig. 19 is a front elevation of same. Fig. 20 is a longitudinal vertical section through the traveling carriage D. Fig. 21 is a vertical cross-section through same. Fig. 22 is a side elevation of the crank-lever G. Fig. 23 is a front elevation of same. Fig. 24 is a plan of same and the traveling carriage D. Fig. 25 is a general view of the center of the machine, showing the action of the grippers L and J, mandrel N, bolt K, and wire-support M. Fig. 26 is a section through the pivoted fork $G^{10}$ for steadying the end of the wire. Fig. 27 is an elevation of the lever O when not in operation. Fig. 28 is a sectional plan of part of the same. Fig. 29 is a plan of the cam O' and lever $O^3$. Fig. 30 is a similar elevation to Fig. 27, but showing the lever O in position after having been operated. Fig. 31 is an elevation of the traveling grip Q. Fig. 32 is a plan of same. Fig. 33 is a plan of the fingers U. Fig. 34 is a vertical sectional elevation of the grippers T and V. Fig. 35 is a plan of the same. Fig. 36 is a sectional plan of the same.

The outline of my machine consists of the bed W, upon which is mounted the driving-shaft X, which is connected with the cross-shaft X', which in turn operates the longitudinal shafts Z and Y by means of the bevel-wheels $x^2$ and $x^3$, and from these three shafts X, Y, and Z the whole of the movements required are obtained.

Figure 5:
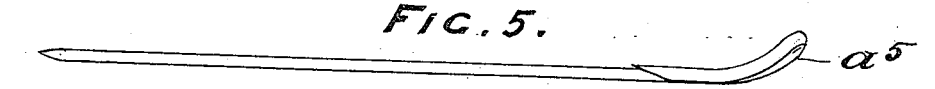

For the purpose of simplifying the description, the machine may be said to be divided into three main parts, 1, 2, and 3, as indicated on Fig. 1 of the drawings, the No. 1 part consisting of the arrangement by which the wire is cut off into lengths and a loop formed at the end, as seen at Fig. 5. In No. 2 part the wire is bent into the shape shown by Fig. 9, and in part No. 3 the knot is tightened into the form shown by Fig. 12 or 13.

The wire A is fed into the machine through the straighteners from the drum by any ordinary feed-slide $A^2$, which in the present case is operated by a roller working in a groove in the cam A' on the shaft X'. The wire when stationary is gripped by the lever B, during which a length is cut off by the diagonal cutter C, which is operated by the cam c' on the shaft Y, as shown in Figs. 17, 18, and 19. This cutter C is mounted in the slide $c^2$, which slides in the main part of the lever, so as to have lateral adjustment by means of the screw $c^6$, and is also provided with the adjustable screws $c^3$ and $c^4$, which are made to operate upon each end of the plate $c^5$ for the purpose of increasing or diminishing the amount of angle at which the wire is severed to form the barbed end, the handle $c^7$ being provided at the end of the lever to enable the wire to be cut off by hand when the machine is not in operation.

Figure 6:
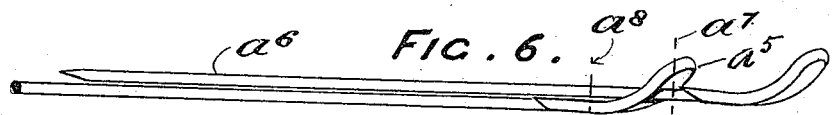
Figure 7:
Figure 8:
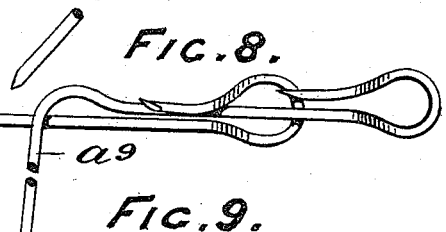
Figure 9:
Figure 11:
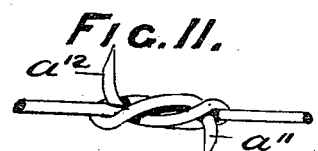
Figure 10:
Figure 12:
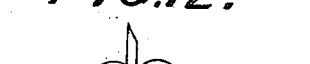

The carriage D is made to slide in the groove W', which is formed in the bed to receive it, the travel of the carriage being effected by means of a roller working in the groove D' of the cam, which is mounted upon the end of the shaft X, with which the carriage is connected by means of the rod $d^2$ and pivoted rod $d^3$, Fig. 2, the rod $d^2$ being connected to the lever $d^4$ at the bottom of the rising and falling screw-rod $d^5$, which screw-rod is provided with the bent head $d^6$, so that as the carriage is drawn forward in the direction of the arrow the head $d^6$ is lowered into the position shown in Figs. 20 and 21, and, the wire having been fed onto the carriage and cut off, as before described, the head $d^6$ falls upon the wire, retaining it in position. Before the carriage advances the sliding bolt H, having the sunk hollow $h^2$, is pressed under the wire by means of the cam H', while the mandrel-bolt F is allowed to advance over the wire by the cams F', the advance being effected by means of the spring $f^2$. The bolt F is mounted in the rising and falling slide $f^3$, which slide is kept up by any suitable spring and depressed by the lever $f^4$, which is acted upon by the cam $f^5$. The depression of this bolt F into the hollow bolt H thus bends the wire, as shown in Fig. 22, causing it to take the form shown in by $a^3$, Fig. 3. The traveling carriage D is held in position by the sliding bolt E, which is operated by the cam E'. The wire is caused to take the form shown by Fig. 4 by means of the crank-lever $G^2$, the crank center $g^3$ of which is pivoted in the slide $g^2$, the other end of the crank being provided with the roller $g^4$, so that as the slide $g^2$ is operated in the direction of the arrow, Fig. 22, by means of a roller on the rod $g^5$, working in a groove in the cam G' on the shaft X', the roller $g^4$ is caused to travel up the incline $g^6$, thus depressing the tool G until the wire is bent around the mandrel F into the shape shown by $a^4$, Fig. 4, after which the mandrel F is withdrawn by the cam F', and the bolt H is pressed still farther forward by the cam H' until the projection $h^2$ presses the bent wire over against the die $d^7$, formed upon the carriage, and the bent head of the wire is caused to take the form shown in plan at $a^5$, Fig. 5. The bolts H and E are then withdrawn by means of any suitable spring, and the carriage D travels forward, as before described, until the head $a^5$ of the wire A is threaded onto the stem $a^6$ of the wire which has previously traveled up, as shown by Fig. 6, and is gripped near the head at the point $a^7$, Fig. 6, by the grippers J, at which time the wire is released from the traveling carriage by its return to repeat the action. The end $a^6$ of the previous wire is kept steady and in position to receive the head of the next wire by means of the steadying-fork $G^{10}$, Fig. 26, which is pivoted onto the slide-support $G^{11}$, the center pivot $G^{12}$ being of hexagonal shape, one face of which receives the end of the spring $g^8$, by which means the fork is kept in position until the carriage comes forward, when it strikes the fork up into the position shown by dotted lines, in which position it is retained by another face of the hexagon receiving the spring, where it remains until depressed, as hereinafter described. The bolt K is then pressed forward by the cams K' until the flange $k^2$ passes in between the two wires and slightly separates them, after which they are gripped at the point $a^8$, Fig. 6, by the grippers L, which are operated by the cams L', the grippers being withdrawn by means of suitable springs. The bolt K is then operated still further by its cam until it bends over the wire into the position shown in Fig. 25 and by plan in Fig. 7, after which the bolt K is withdrawn by a suitable spring. The bolt M is then forced forward by its cam and is provided with the stop $m^2$ to keep the wire in position, while the split mandrel N is forced forward between the two wires, as seen in Figs. 25, 27, and 28, and the lever O is depressed by the cam O' on the shaft Z until the end $a^9$ of the wire is bent down over the mandrel N into the position shown by Fig. 8 and by dotted lines in Fig. 27, the lever O at the same time, in conjunction with the bolt M, gripping the one wire, while the end of the other wire is bent up from underneath by the cranked lever P, Fig. 2, the action of which corresponds exactly with the action of the cranked lever $G^2$, before described, the slide $p^4$ being operated by the grooved cam P' through the levers $p^2$ and rod $p^3$. The previous knot is then gripped by the traveling grippers Q, as hereinafter described, and the grippers L are withdrawn, leaving the grippers M and O gripping the wire until the two wires are drawn tighter together, as shown by Fig. 10, after which the grip of M and O is relaxed, as afterward described, and the wire is then carried forward until the next knot is in position for being gripped by the traveling grippers Q, the relaxing of M and O being effected by means of the arrangement of the secondary cam $o^2$ and lever $o^3$, as seen in Fig. 30. The wire A is gripped merely by the strength of the spring $o^4$, so as to allow of the end of the wire being withdrawn through the grippers M and O, the lever O afterward taking the position shown in Fig. 27 again. A projection $o^5$, Figs. 1 and 28, is formed upon the lever O for the purpose of depressing the mouth of the fork $G^{10}$ upon the end $a^{10}$ of the wire to steady it ready for the next wire which the carrier D has to thread upon it. The lever O is mounted upon the shaft $o^{11}$, the operating end being shown broken away in Fig. 1, so as not to confuse the drawings. The grippers Q are mounted upon the lever $q^2$, which is pivoted to the bed W at $q^3$, which lever is operated by the side of the cam Q' in the one direction and has a suitable spring to operate it in the other direction. The face of the cam Q' is formed to operate the gripper $q^4$ upon the knot of the wire, the gripper Q being a fixture upon the lever $q^2$, a suitable spring being arranged in any convenient position for opening the grippers when the cam allows of it. The grippers R are then withdrawn from gripping wire at the rear of knot by means of a suitable spring, and the grippers S grip the wire in front of the knot, while the traveling gripper Q returns to bring up another knot, after which the grippers S again open to allow the knot to be pushed through, which is effected by the traveling grippers Q bringing up the next knot, thus pushing the previous one on in front until it arrives in the position opposite the fingers U, which are forced forward by the cams U' until they press the barbed ends out, as shown in Fig. 33, after which they are withdrawn by suitable springs, and the barbed ends $a^{11}$ and $a^{12}$ are gripped by the vertical grippers V and V', as shown in Figs. 34, 35, and 36. The top and bottom tools of the gripper V for gripping the barbed end $a^{11}$ of the wire are mounted upon the traveling carriage $T^2$, the bottom tool $v^3$ being fixed to the bed of the carriage and the top tool being fixed at the one end in the lever $v^4$, the other end of which is pivoted to the support $t^3$, which is in turn mounted upon the carriage $T^2$. The top and bottom tools of the gripper V' for gripping the barbed end $a^{12}$ of the wire are fixed stationary upon the bed and do not travel, the bottom tool being fixed to the bed W of the machine and the top tool $v^6$ being fixed in the lever $v^7$, which is pivoted to the support $v^8$ on the bed W. The pair of horizontal grippers T are also mounted upon the carriage $T^2$ for gripping the wire in the position shown, the tools being mounted in the levers $t^4$, which are pivoted to the traveling carriage $T^2$ at $t^5$ and provided at the reverse end with the rollers $t^6$, which, as the carriage $T^2$ travels in the direction of the arrow in Fig. 35, are wedged apart by the wedge-piece T', thereby gripping and pulling the wire at T, the travel of the carriage being effected by the roller $t'$ upon the carriage working in the groove in the cam $T^8$ upon the shaft $X^7$. The vertical grippers V and V' are operated by the pivoted levers $v^9$ and $v^{10}$ from the cams $V^2$, the top grippers being kept up when not gripping by means of suitable suspending-springs. It will thus be seen that while the rear end of the wire is gripped in a fixed position by the grippers S and the barb $a^{12}$ is gripped in a fixed position by the grippers V' the front part of the wire is gripped by the traveling grippers T and the barb $a^{11}$ by the traveling grippers V, by which means the knot is drawn tightly into the shape shown by Fig. 12 or 13, the difference being effected by a slight variation in the position of the vertical grippers V and V'. When the traveling carriage $T^2$ is ready to make its return journey, the wedge-shaped piece T', which is pivoted at $t^9$ and kept down by the spring $t^{10}$, is tilted up clear of the rollers $t^6$ by means of the projection $t^{11}$ on the cam $T^8$, thus allowing the spring $t^{12}$ to open the grippers T while the knot passes between them. The top tools of the vertical grippers V and V' are made to lap into the bottom tools, which are made to receive them, so that as the top tool is depressed upon the wire-barb ends $a^{11}$ and $a^{12}$ the ends are bent more or less at right angles to the wire, as may be desired, or arranged for by the shape of the tools.

It is evident that my machine is applicable to tying metal together for purposes other than for fencing and that the motions here shown may be somewhat varied by using equivalents.

What I claim, then, is—

1. In a machine for manufacturing barb-wire fencing and other wire articles, the carriage for the wire and the screw-rod $d^5$, having a bent head $d^6$, overlapping said wire, in combination with a fixed part of the machine through which said screw-rod works and the driving-shaft and rod and lever connections between said shaft and said screw-rod, whereby the latter may be turned to draw its head down on the wire while the carriage is moving forward, substantially as set forth.

2. The mechanism for bending one end of the wire into a loop, as shown, consisting of a mandrel around which said wire is bent, in combination with a crank-lever, a tool carried thereby, a slide in which said lever is pivoted, a roller carried by the rear end of said lever, a fixed incline with which said roller comes in contact, and actuating devices for moving said slide longitudinally in order that the said roller by riding up the said incline may cause the said crank-lever to depress the said tool, thereby bending the wire around the said mandrel, substantially as set forth.

3. The mechanism for threading and forming the second loop of the knot in the wire, consisting of a fork which holds one piece of wire in position to receive the head of the next wire, an endwise-moving bolt K, provided with a flange, for slightly separating said wires, grippers L, which hold said wires after being thus separated, a bolt M, provided with stops, for holding said wire after said bolt K has bent it by farther advance and said grippers have been withdrawn, a split mandrel N and devices for forcing it between the wires, a lever O for bending one of said wires around said mandrel, a bolt M for holding this wire, a crank-lever P for bending the end of the other wire up from underneath, as described, and actuating mechanism for the foregoing parts, substantially as and for the purposes set forth.

4. The wire-holding fork $G^{10}$, in combination with its slide, the pivot, partly hexagonal, by which it is mounted therein, a spring bearing against one or another of the faces of said pivot according to the position in which said fork is temporarily retained, feeding devices for passing another piece of wire to the piece held by said fork, and devices for bending and tying said pieces of wire together, substantially as set forth.

5. In combination with grips for the two pieces of wire which are to be tied together, a mandrel N and mechanism for forcing it between said wires, and levers O and P and their actuating mechanism for bending one of said wires around said mandrel and the other wire up from underneath, substantially as set forth.

6. The mechanism for bending the barbed ends of the wire over and tightening the knot, consisting of the fingers U and actuating mechanism which presses out the barbed ends, as shown, the stationary grippers V', which hold one of the barbs, the stationary grippers S, which hold the rear end of the other wire, the traveling carriage and its operating mechanism, and the grippers T and V, mounted on said carriage and respectively holding the other barb and the rear end of the other wire, substantially as set forth.

7. In combination with the bed, driving-shaft, and wire-carriage of a machine for making wire fences and other articles of interlocking pieces of wire, a cutting-tool for severing such pieces or sections, a mandrel on which each of said sections is bent to form a loop at one end, a tool and a lever which carries and operates said tool for bending said wire on said mandrel, a retaining device which holds said wire after the return of said carriage and until the next wire is fed up to interlock therewith, a mandrel which separates the said wires, a pair of levers which bend one of said wires around said mandrel and the other wire up through the loop thus formed, grippers on the carriage which hold one wire by the front end and the other wire by the rear end, stationary grippers which hold the other ends of said wires in order that the knot may be tightened as the carriage moves, and the necessary actuating, retaining, and connecting devices whereby the said driving-shaft causes the aforesaid operations of these various parts, substantially as set forth.

In testimony that I claim the foregoing as my own I affix my name in the presence of two witnesses.

ARTHUR EDMUND GORSE.

Witnesses:
LEWIS WM. GOOLD,
GEORGE PRICE.